US009447723B2

(12) United States Patent
Hirth et al.

(10) Patent No.: US 9,447,723 B2
(45) Date of Patent: Sep. 20, 2016

(54) MULTIPLE INLET EXHAUST GAS TURBOCHARGED ENGINE WITH AN AXIALLY MOVEABLE AND ROTATABLE ADJUSTMENT RING

(75) Inventors: Torsten Hirth, Rutesheim (DE); Stephan Krätschmer, Schwäblsch Gmünd (DE); Michael Stiller, Schwaikheim (DE); Siegfried Sumser, Stuttgart (DE)

(73) Assignee: DAIMLER AG, Stuttgart (DE)

( * ) Notice: Subject to any disclaimer, the term of this patent is extended or adjusted under 35 U.S.C. 154(b) by 1225 days.

(21) Appl. No.: 12/927,865

(22) Filed: Nov. 27, 2010

(65) Prior Publication Data

US 2011/0067397 A1    Mar. 24, 2011

Related U.S. Application Data

(63) Continuation-in-part of application No. PCT/EP2009/005348, filed on Jul. 23, 2009.

(30) Foreign Application Priority Data

Aug. 21, 2008   (DE) .................. 10 2008 039 085

(51) Int. Cl.
  *F02B 37/22*   (2006.01)
  *F02M 26/05*   (2016.01)
  (Continued)

(52) U.S. Cl.
  CPC ............ *F02B 37/22* (2013.01); *F02B 37/025* (2013.01); *F02B 37/18* (2013.01); *F02B 37/24* (2013.01); *F02M 26/05* (2016.02); *F02M 26/10* (2016.02); *F02M 26/43* (2016.02); *F01N 13/107* (2013.01); *F02B 29/0406* (2013.01); *F02M 26/23* (2016.02); *Y02T 10/144* (2013.01)

(58) Field of Classification Search
  CPC ...... F02B 37/025; F02B 37/18; F02B 37/22; F02B 37/24; F02B 29/0406; F02M 25/0707; F02M 25/0713; F02M 25/0749; F02M 25/0727; F02M 26/43; F01N 13/107; Y02T 10/144; Y02T 10/121
  USPC ............................. 60/602, 605.2; 123/559.1
  See application file for complete search history.

(56) References Cited

U.S. PATENT DOCUMENTS 2,180,468 A * 11/1939 Hochstim ................... 222/229
4,177,005 A * 12/1979 Bozung .................. F01D 9/026
                                                                    415/128

(Continued)

FOREIGN PATENT DOCUMENTS

JP         01-58726       4/1989
JP         05 133238      5/1993

*Primary Examiner* — Mary A Davis
(74) *Attorney, Agent, or Firm* — Klaus J. Bach (57) ABSTRACT

In an internal combustion engine for a motor vehicle having an exhaust gas turbo-charger comprising a compressor arranged in an intake tract of the internal combustion engine and a turbine arranged in an exhaust gas tract of the internal combustion engine, with a turbine wheel disposed the turbine housing, an adjustment device is provided by means of which a spiral inlet cross section of a spiral turbine inlet channel and a nozzle cross section of the spiral inlet channel to the turbine wheel are jointly adjustable by a common adjustment device. The invention further relates to an exhaust gas turbocharger, a motor vehicle having an internal combustion engine and a method for operating an internal combustion engine having an exhaust gas turbocharger.

8 Claims, 10 Drawing Sheets

(51) Int. Cl.
*F02M 26/10* (2016.01)
*F02M 26/43* (2016.01)
*F02B 37/02* (2006.01)
*F02B 37/18* (2006.01)
*F02B 37/24* (2006.01)
*F01N 13/10* (2010.01)
*F02B 29/04* (2006.01)

(56) References Cited

U.S. PATENT DOCUMENTS

| | | | | |
|---|---|---|---|---|
| 6,260,358 | B1* | 7/2001 | Daudel | F02B 37/22 60/605.1 |
| 8,047,772 | B2* | 11/2011 | Petitjean et al. | 415/158 |
| 8,191,367 | B2* | 6/2012 | Lombard et al. | 60/602 |
| 9,291,092 | B2* | 3/2016 | Sumser | F02B 37/00 |
| 2005/0056015 | A1* | 3/2005 | Fledersbacher et al. | 60/602 |
| 2006/0233640 | A1* | 10/2006 | Lombard | F01D 17/143 415/159 |
| 2007/0130943 | A1* | 6/2007 | Sausse | F01D 17/165 60/602 |
| 2008/0038110 | A1* | 2/2008 | Roberts | F01D 9/026 415/191 |
| 2008/0209905 | A1* | 9/2008 | Petitjean et al. | 60/602 |
| 2009/0064679 | A1* | 3/2009 | Parker | F01D 17/141 60/602 |
| 2009/0142186 | A1* | 6/2009 | Parker | F01D 17/143 415/159 |
| 2011/0232282 | A1* | 9/2011 | Anschel | F01D 9/026 60/615 |
| 2013/0276444 | A1* | 10/2013 | Hirth | F01D 17/141 60/605.1 |
| 2014/0000256 | A1* | 1/2014 | Hirth | F02B 37/025 60/605.2 |

* cited by examiner

MULTIPLE INLET EXHAUST GAS TURBOCHARGED ENGINE WITH AN AXIALLY MOVEABLE AND ROTATABLE ADJUSTMENT RING

This is a Continuation-In-Part Application of pending international patent application PCT/EP2009/005348 filed Jul. 23, 2009 and claiming the priority of German patent application 10 2008 039 085.2 filed Aug. 21, 2008.

BACKGROUND OF THE INVENTION

The invention relates to an internal combustion engine for a motor vehicle and to an exhaust gas turbocharger for an internal combustion engine and to a method for operating an internal combustion engine with an exhaust gas turbocharger.

Due to the continuous tightening of the emission limit values, for example the NO and soot emission values, the demands of exhaust gas turbochargers or charged internal combustion engines also increase. Thus, increasing demands regarding the charge pressure provision with high exhaust gas return rates over average to high load demand regions of the internal combustion engine result, whereby the turbines of exhaust gas turbochargers are increasingly scaled down geometrically. In other words, the required high turbine performances of exhaust gas turbochargers are realized by an increase of the retention ability or by the reduction of the flow capacity of the turbines in cooperation with the respective internal combustion engine. A further influencing of the performance of exhaust gas turbochargers results by exhaust gas aftertreatment systems as for example soot filters, catalysts or SCR systems arranged in the exhaust gas tract downstream of the turbine. These exhaust gas aftertreatment systems lead to a pressure increase at an exhaust gas outlet of the exhaust gas turbocharger. This again effects a reduction of a turbine pressure drop describing the performance of the exhaust gas turbocharger, wherein the turbine pressure drop can be determined as a quotient of a pressure in front of the turbine wheel or an exhaust gas inlet of the turbine housing and a pressure behind the turbine wheel or an exhaust gas outlet of the turbine wheel. Also due to this reason, the turbine size has to be designed again to smaller values and thus lower efficiencies in order to be able to satisfy the performance demand of the compressor. A certain improvement is hereby offered by exhaust gas turbochargers known from the state of the art, whose turbine housings comprise two spiral channels through which exhaust gas can be directed independently to the turbine wheel and that are usually formed in an asymmetric manner, which are respectively coupled to different exhaust gas lines of an exhaust gas tract of the internal combustion engine. The exhaust gas lines on their part are thereby associated with different cylinders or cylinder groups of the internal combustion engine.

Such an internal combustion engine with an exhaust gas turbocharger is for example known from DE 100 48 237 A1. The exhaust gas turbocharger comprises a compressor in an intake tract of the internal combustion engine and a turbine in an exhaust gas tract of the internal combustion engine. The turbine thereby has a turbine housing which comprises spiral channels coupled to an exhaust gas line of the exhaust gas tract and a turbine wheel, which is arranged within a receiving space of the turbine housing and which can be acted on with exhaust gas of the internal combustion engine fed through the spiral channels for driving a compressor wheel of the compressor connected in a rotationally fixed manner to the turbine wheel by means of a shaft. The turbine housing is additionally provided with a variable turbine geometries including for example pivotable guide vanes which are disposed in the nozzle flow cross sections of the spiral channels leading to the space receiving the turbine wheel and which can be adjusted by means of the pivotable guide vanes.

With the design boundary conditions of exhaust gas turbochargers, which are usually defined by the nominal operating point, the charging change side and the usage side of the internal combustion engine, in particular the lower load and speed region of internal combustion engines can however not be served optimally even by exhaust gas turbochargers with two asymmetric spiral channels. The spiral inlet cross section of the spiral channels has to be chosen to be relatively small up to now for this purpose, in order to be able to generate the necessary exhaust gas flow speeds. With the cost-efficient sand casting methods usually used for producing the turbine housing, there are additionally manufacture-technical limits, so that only spiral channels with nozzle cross sections over 4.5 mm can be reasonably accurately produced. Thereby, comparatively high tolerances of 10% and more result with the casting, which leads to efficiency losses of the exhaust gas turbocharger.

It is thus the object of the present invention to achieve an efficiency improvement in larger operating ranges of a charged internal combustion engine with cost-efficient production methods.

SUMMARY OF THE INVENTION

An internal combustion engine which enables an efficiency improvement in a larger operating region while maintaining cost-efficient production methods is created according to the invention in that the turbine of the exhaust gas turbocharger comprises an adjustment device by means of which a inlet cross section to the spiral channel and a nozzle flow cross section of the spiral channel leading to the receiving chamber of the turbine rotor can be adjusted together. In this manner, the aim of maintaining a cost-efficient production method, e.g. a sand casting method can be fulfilled on the one hand with low demands on the manufacture tolerances for the manufacture of the turbine housing and on the other hand a constructively particularly simple and variable adjustability of the gas supply to the turbine wheel with a corresponding efficiency increase of the exhaust gas turbocharger and thus of the internal combustion engine can be realized in a cost-effective manner. With the help of the adjustment device according to the invention, the back-pressure behavior of the turbine can be influenced in a defined manner and the gas supply to the turbine wheel can be controlled in a particularly simple manner between a partial and a full application. The internal combustion engine can in principle be a spark ignition, a self-ignition gasoline or a Diesel engine.

In a further advantageous arrangement of the invention it is provided that the adjustment device comprises an adjustment ring which is arranged concentrically with the axis of rotation of the turbine wheel disposed in the turbine housing and which is connected to at least one blocking body arranged in the region of the nozzle cross section. The blocking body is moved by rotational and/or translational movement of the adjustment ring at least between a position reducing the spiral inlet cross section and the nozzle cross section and a position increasing the spiral inlet cross section and the nozzle cross section. This represents a constructively simple and installation space saving possibility to influence the back-pressure forming capability of the turbine corresponding to the geometric design of the two cross sectional surfaces or of the blocking bodies to each other simultaneously by means of a simple rotary movement. Compared to the varied devices known from the state of the art, where guide vanes are rotated or displaced in an axial manner in front of the turbine wheel, there is additionally a large advantage with regard to a reduced mechanical susceptibility, or of the functional ensuring over the life of the internal combustion engine with low costs.

Advantageously, at least one blocking body is formed with an aerodynamic surface shape in its cross section. The inflow of the turbine wheel can be adapted hereby in a particularly simple manner to different geometric designs and aerodynamic properties of the turbine housing, whereby a further improvement of the overall efficiency of the internal combustion engine is provided.

In a further advantageous arrangement it is provided that the adjustment device comprises an adjustment lever connected to the adjustment ring which is guided through the turbine housing and which can be moved relative to the turbine housing in a rotational and/or translational manner for adjusting the spiral inlet cross section and the nozzle cross section. The adjustment of the adjustment ring of the adjustment device can hereby take place from the outside of the turbine housing—for example with the help of an associated actuator —. In this manner, a high constructive freedom and a simple adaptability to different types of internal combustion engines, equipment lines and the like is possible.

In a further arrangement of the invention it has been shown to be advantageous if the turbine housing comprises at least one further spiral channel which is coupled to at least one further exhaust gas line of the exhaust gas tract. By the multi-flow arrangement, the turbine has an increased efficiency with reduced reaction times and has altogether an improved response behavior over a larger speed region of the internal combustion engine. It can be provided thereby that one of the spiral channels (AGR spiral) is formed for the representation of an exhaust gas recirculation capability and a further spiral channel ($\lambda$-spiral) for the representation of a suitable air fuel ratio for generating a desired behavior of the internal combustion engine, whereby the fuel usage and also the contaminants, in particular the $NO_x$ particle emission are lowered significantly. It can also be provided that the spiral channel and the at least one further spiral channel are formed symmetrically and/or asymmetrically.

In a further advantageous arrangement of the invention it is provided that the nozzle cross-sections of the spiral channel and of the at least one further spiral channel are arranged distributed adjacent to each other along the rotational axis of the turbine wheel and/or around the rotational axis over a circumference of the turbine wheel. The spiral channel and the at least one further spiral channel of the multi-flow channel turbine can in other words be connected in parallel and/or in series, so that the turbine wheel can be acted on with exhaust gas in a particularly variable manner. In addition to an increased constructive freedom, a further improvement of the total efficiency of the internal combustion engine is given hereby.

Further advantages result when the adjustment device is formed to adjust the spiral inlet flow cross-sections of the spiral channel and of the at least one further spiral channel and the and the nozzle flow cross-sections of the spiral channel and the at least one further spiral channel to the receiving space together in an adjustable manner. In other words, the spiral channels can thus be changed simultaneously in their retention behavior by means of the adjustment device, whereby the specific and the absolute turbine performance can be adjusted or regulated in a particularly simple manner and depending on demand.

In a further advantageous arrangement of the invention it is provided that the adjustment device is formed for blowing exhaust gas between the spiral channel and the at least one further spiral channel. This enables—for example in the nominal point of the turbine—a volitional decrease of the retention capability in one of the exhaust gas lines in a constructively simple manner. It can thereby be provided that a spiral channel formed as AGR spiral is arranged upstream of the further spiral channel formed as $\lambda$-spiral. If the blowing functionality is to be realized for the general case, the smaller flow or the smaller spiral channel is conveniently arranged upstream of the larger flow or of the larger spiral channel., so that the blowing over the entire speed region of the internal combustion engine can take place in a reliable manner.

It has been shown in a further arrangement of the invention if the spiral channel and/or possibly the at least one further spiral channel is formed as a full spiral, in particular with a wrapping angle>350°, and/or as a partial spiral, in particular with a wrapping angle between 350° and 30°, and/or as a segment spiral and/or symmetrically and/or asymmetrically. This permits a particularly variable adaptability to different types of internal combustion engines and thus a simple optimization of the total efficiency.

Further advantages result if the exhaust gas return device is provided by means of which exhaust gas is guided from the exhaust gas tract into the intake tract. This permits in connection with the adjustment device according to the invention a particularly reliable adjustability of a desired operating behavior of the internal combustion engine with regard to fuel consumption and contaminant emissions, in particular with regard to $NO_x$ particle emissions.

In a further advantageous arrangement of the invention it is provided that a gas guide device is arranged in the exhaust gas tract upstream of the turbine, by means of which outlets of several cylinders of the internal combustion engine can be connected to at least one spiral channel and/or exhaust gas can be conducted past the turbine. The gas guiding device, which can in other words be formed as a blow-by or blow-off device, enables in the case of a blow-by functionality the change between a blocking charging and an impulse charging operation of the turbine. In the case of a blow-off function, a simple possibility for the charge pressure regulation is given, in that exhaust gas can be conducted past the turbine when necessary.

A further aspect of the invention relates to an exhaust gas turbocharger for an internal combustion engine, in particular for an internal combustion engine according to one of the previous embodiments, wherein an efficiency improvement of the exhaust gas turbocharger and thus its associated internal combustion engine is achieved in a larger operating range while maintaining cost-effective production methods according to the invention in that the turbine comprises an adjustment device by means of which a spiral inlet flow cross-section of the spiral channel and a nozzle flow cross-section from the spiral channel to the turbine wheel receiving space can be adjusted together. With the help of the adjustment device, several flow cross sections of the turbine can thus be changed simultaneously, whereby the exhaust gas energy can be used in an improved manner and in particular the back pressure behavior and thus the performance of the turbine of the exhaust gas turbocharger can be adjusted in a variable and operationally-safe manner with high efficiencies. Additionally, efficient production methods can still be used, for example sand casting methods, as the exhaust gas turbocharger according to the invention only makes comparatively low demands on the manufacturing tolerances.

A further aspect of the invention relates to a motor vehicle with an internal combustion engine according to one of the previous embodiments and/or with an exhaust gas turbocharger according to the previous embodiment. The advantages resulting here from, in particular regarding the achievable efficiency improvement while maintaining cost-effective production methods, can be taken from the previous descriptions.

A further aspect of the invention finally relates to a method for operating an internal combustion engine according to one of the previous embodiments, in which the spiral inlet cross section of the spiral channel and the nozzle flow cross section from the spiral channel to the receiving space are adjusted in dependence on an operating state of the internal combustion engine by means of the adjustment device of the turbine. An efficiency improvement of the internal combustion engine is also achieved hereby in a larger operating range while maintaining cost-effective production methods. It can thereby be provided that the spiral inlet flow cross-section and the nozzle flow cross-section are adjustable by means of the adjustment device in dependence on an operating point of the internal combustion engine. It can for example be provided that the spiral inlet cross-section and the nozzle cross-section are reduced with low engine speeds in order to obtain the maximum energy from the exhaust gas. It can be provided inversely that the spiral inlet cross-section and the nozzle cross-section are increased with higher engine speed, so that the required charge pressure is achieved with a low turbine pressure ratio.

The invention will become more readily apparent from the following description of several embodiments on the basis of the accompanying drawings, in which the same, or functionally the same, elements are provided with identical reference numerals.

DESCRIPTION OF PARTICULAR EMBODIMENTS

Figure 1:
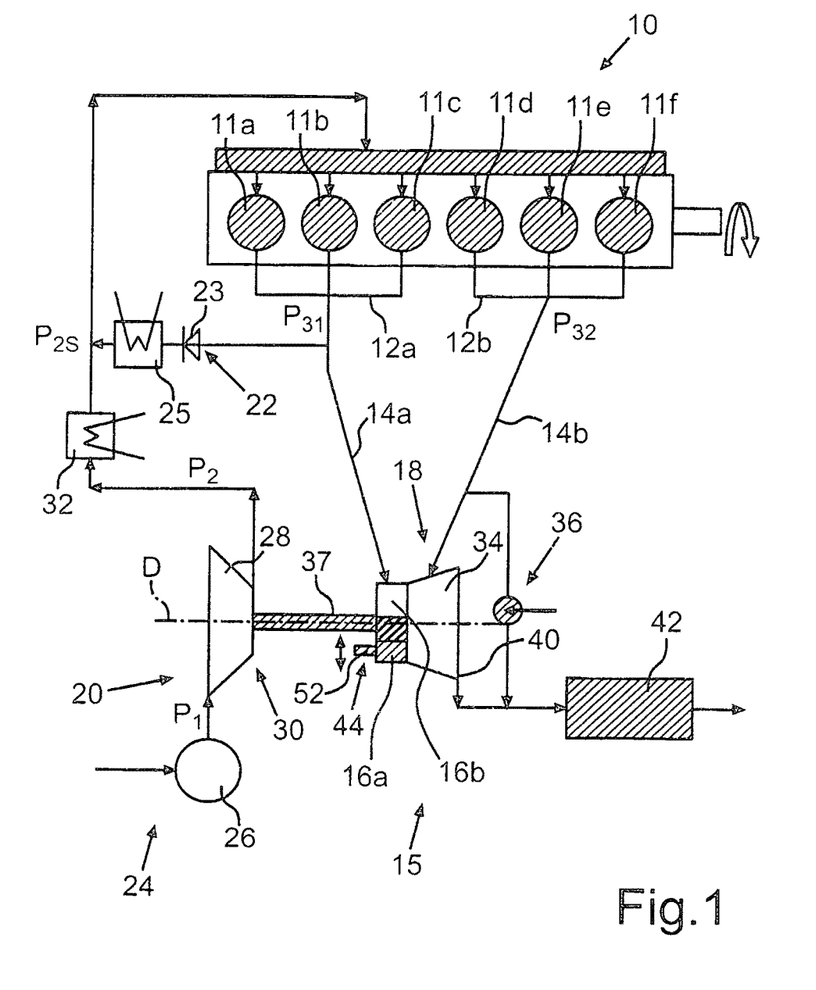
FIG. 1 shows schematically an internal combustion engine in principle according to a first embodiment with a multi-flow exhaust gas turbocharger comprising an adjustment device.

FIG. 1 shows in principle an internal combustion engine 10 according to a first embodiment for a commercial vehicle. The internal combustion engine 10 may be in principle a Diesel, a spark ignition or a compression ignition engine and as shown comprises 6 cylinders 11$a$-$f$ of which the cylinders 11$a$-$c$ are combined in a first cylinder group 12$a$ and the cylinders 11$d$-$f$ in a second cylinder group 12$b$. Two exhaust gas lines 14$a$, 14$b$ of an exhaust gas tract 15 of the internal combustion engine 10 are associated with the cylinder groups 12$a$, 12$b$, of which the first exhaust gas line 14$a$ is coupled to a first spiral channel 16$a$ formed as a partial spiral via corresponding manifolds and the second exhaust gas line 14$b$ to a second spiral channel 16$b$, also formed as a partial spiral of a turbine 18 of an exhaust gas turbo-charger 18. The spin-determining spiral channels 16$a$, 16$b$ thereby comprise connection flanges 17$a$, 17$b$ arranged adjacent to each other and sealed against each other in a gas-tight manner. The connection flange 17$b$ and a feed channel 19 of the spiral channel 16$b$ extends essentially in the direction of view below the spiral channel 16$a$, wherein the end of the feed channel 19 appears in the drawing plane in front of a spiral inlet cross section $A_{SO,AGR}$ and the stationary housing tongue 101. The construction of the double-flow exhaust gas turbocharger 20 or its turbine 18 is explained further in connection with FIG. 2, in which a schematic cross section of the turbine 18 is shown with the two spiral channels 16$a$, 16$b$ connected behind each other over the turbine wheel circumference.

Upstream of the first spiral channel 16$a$, which is also formed as a partial spiral as the second spiral channel 16$b$ and which has a wrapping angle $\phi_S$ of about 135°, is arranged an exhaust gas return device 22 (AGR device, also commonly known as exhaust gas recirculation device or EGR device) known per se in the exhaust gas tract 15, by means of which a part of the exhaust gas is to be transported from the exhaust gas line 14$a$ into an intake tract 24 of the internal combustion engine 10. The intake tract 24 comprises an air filter 26 and a charge-air cooler 32 arranged downstream of a compressor wheel 28 of a compressor 30 of the exhaust gas turbocharger 20. The exhaust gas return device 22 comprises a controllable exhaust gas return valve 23 and an exhaust gas cooler 25, by means of which the exhaust gas temperature can be cooled. The second exhaust gas line 14b is coupled to a gas feeding device 36 upstream of a turbine wheel 34 of the turbine 18, by means of which exhaust gas is guided past the turbine 18. The turbine wheel is usually connected to the compressor wheel 28 in a rotationally fixed manner by means of a shaft 37. The gas feeding device can on its part be integrated into a turbine housing 38 in principle or can be formed as a self-contained component. An exhaust gas aftertreatment system 42 is arranged in the exhaust gas tract down-stream of an exhaust gas outlet of the turbine housing 38, which system can be formed for example as a soot filter, catalyst or SCR system in dependence on the arrangement of the internal combustion engine 10.

The first spiral channel 16a formed as a so-called AGR spiral thereby serves for containing the exhaust gas, so that exhaust gas from the exhaust gas tract 15, in which the pressure P31 is present can be guided by means of the AGR device 22 into the intake tract 24, in which the pressure P2S is present. The second spiral channel 16b formed as a so-called λ-spiral, effects the necessary air fuel ratio of the internal combustion engine 10 by means of its retention capability. In order to enable an efficiency improvement in a larger operating region while maintaining cost-efficient production processes, the turbine 18 of the exhaust gas turbocharger 20 comprises—as can in particular be seen in FIG. 3—an adjustment device 44, by means of which spiral inlet cross sections $A_{S,\lambda}$, $A_{S,AGR}$ of the spiral flow channels 16a, 16b can be adjusted together with radially open nozzle cross sections $A_{R,\lambda}$, $A_{S,AGR}$ of the spiral channels 16a, 16b serving for the wheel inflow process towards a receiving space 46, in which the turbine wheel 34 is arranged.

The adjustment device 44 thereby has an adjustment ring 48 arranged concentrically to a rotational axis D of the turbine wheel 34 in the turbine housing 38 (see FIG. 3), which is connected to two blocking bodies 50a, 50b arranged in the region of the nozzle cross sections $A_{R,\lambda}$, $A_{R,AGR}$. The adjustment device 44 thereby has an adjustment ring 48 arranged concentrically to a rotational axis D of the turbine wheel 34 in the turbine housing 38 (see FIG. 3), which is connected to two blocking bodies 50a, 50b arranged in the region of the nozzle cross sections $A_{R,\lambda}$, $A_S$, $_{AGR}$. The blocking bodies 50a, 50b are preferably streamlined in their cross section and can be moved by rotational movement of the adjustment ring 48 according to the double arrow II around the rotational axis D between a position reducing the spiral inlet cross sections $A_{S,\lambda}$, $A_{S,AGR}$ and the nozzle cross sections $A_{R,\lambda}$, $A_{R,AGR}$ and a position increasing the spiral inlet cross sections $A_{S,\lambda}$, $A_{S,AGR}$ and the nozzle cross sections $A_{R,\lambda}$, $A_{R,AGR}$, which changes the circumferential length of the radial turbine inlet nozzle cross-sections. The circumferential length is pointed to by arrows to $A_{R,\lambda}$, $A_{R,AGR}$ in FIG. 2 and is defined between the blocking bodies 50a, 50b of the respective areas $A_{R,\lambda}$, $A_{R,AGR}$. The blocking bodies 50a, 50b also move in the axial direction, as shown in FIG. 3 by the adjustment lever 52 which adjusts the axial width of the turbine inlet nozzle cross-sections $A_{S,\lambda}$, $A_{S,AGR}$. The blocking bodies 50a, 50b are thereby shown in FIG. 2 rotated out of a starting position together with the angle ε1, so that the spiral inlet cross sections $A_{S,\lambda}$, $A_{S,AGR}$ are correspondingly reduced compared to the maximum spiral inlet cross sections $A_{SO,\lambda}$, $A_{SO,AGR}$ in the starting position. At the same time, the nozzle cross sections $A_{R,\lambda}$, $A_{R,AGR}$ are also correspondingly reduced by the blocking bodies 50a, 50b. With the help of the adjustment device 44, both turbine sides—AGR and the λ side—can thus be regulated or controlled simultaneously corresponding to the geometric design of the spiral channels 16a, 16b and the blocking bodies 50a, 50b. By the different geometric design of the spiral progressions in the entire adjustment angle region ε of the blocking bodies 50a, 50b, multiple combinations can be generated. The desired AGR capability of the turbine 18 together with the desired air amount transport of the compressor 30 can thus be adjusted in a constructively simple and cost-efficient manner in an adjustable manner for a suitable air fuel ratio λ for generating a desired operating behavior of the internal combustion engine with regard to usage and $NO_x$ particle emission. The adjustment angle region ε in connection with the change of the characteristic spiral inlet cross sections $A_{S,\lambda}$, $A_{S,AGR}$ influences the retention behavior of the engine exhaust gas or on the swirl generation of the turbine 18. As the specific turbine performance Au according to the general formula $$Au \sim c1u \sim 1/A_S$$

Figure 2:
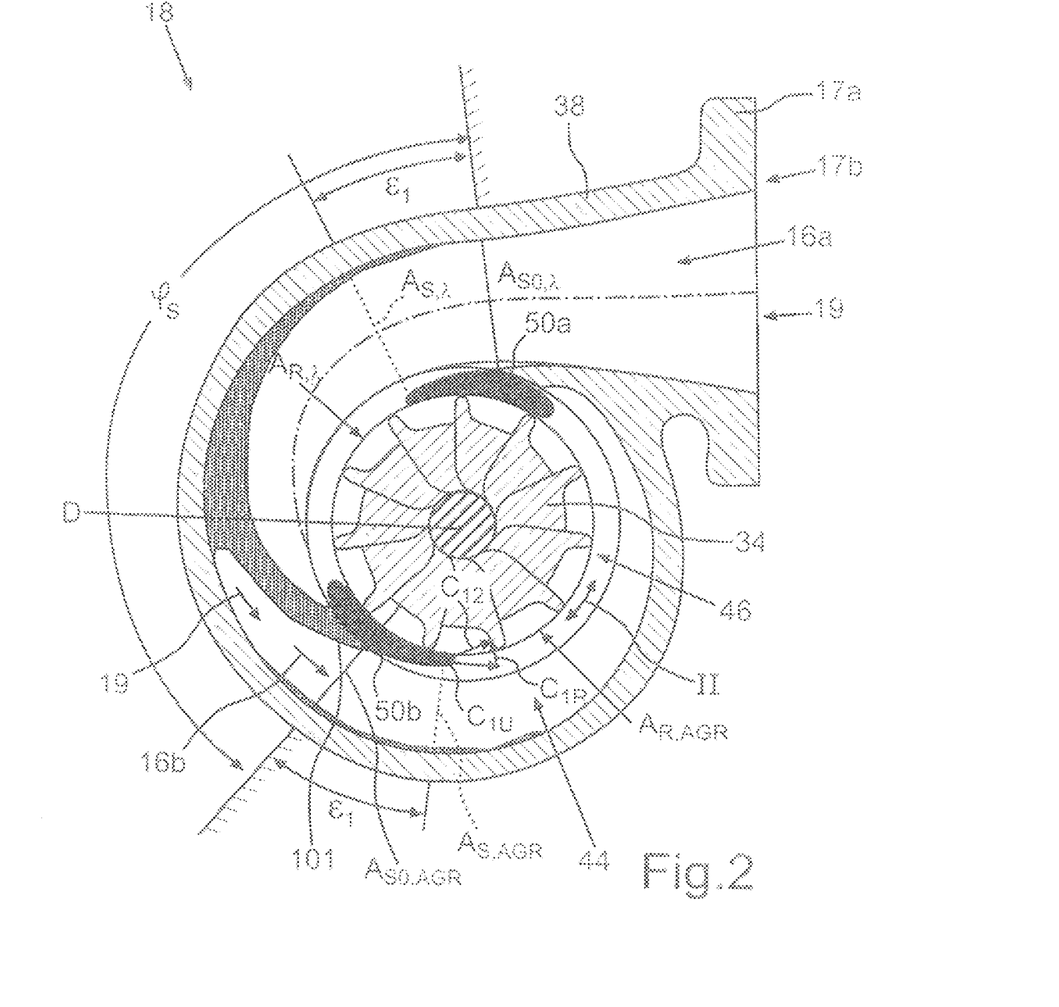
FIG. 2 is a schematic cross sectional view of a turbine of the exhaust gas turbo-charger shown in FIG. 1 with two spiral channels formed as partial spirals, wherein the adjustment device is shown in a position reducing spiral inlet cross sections and nozzle cross sections of the spiral channels.
Figure 3:
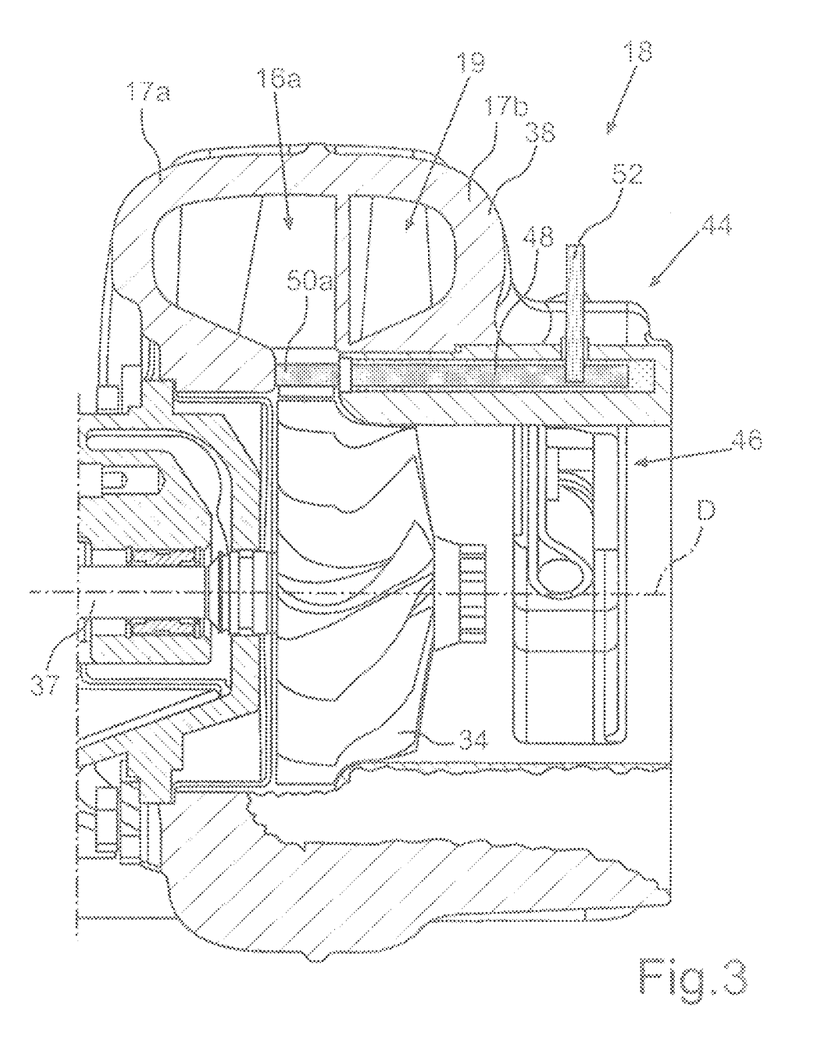
FIG. 3 is a schematic side view and partially in section of the turbine of the exhaust gas turbocharger shown in FIG. 1 and FIG. 2.

Is proportional to the circumferential component $c1u$, the specific and the absolute turbine performance can be regulated via the surface influencing the spiral inlet cross sections $A_S$ (see velocity triangle FIG. 2).

The installation space requirement of the rotatable adjustment device 44 is thereby very small. Compared to the various devices known from the state of the art, where guide blades are rotated or displaced axially in front of the turbine wheel 34, there is additionally a large advantage with regard to a reduced mechanical susceptibility, whereby a functional warranty over the entire engine life is given with correspondingly reduced maintenance and spare part costs. The retention capability for the flowing exhaust gas in the exhaust gas line 14a responsible for the exhaust gas return or of the AGR segment of the exhaust gas tract 15 will thereby necessarily be higher due to the AGR requirement than the one of the exhaust gas line 14b or of the λ-segment with the spiral channel 16a. The λ-segment is thus preferably designed without consideration the necessary negative pressure drop (p2s-p31) of the AGR segment for AGR conditions so as to provide a favorable charge-change pressure difference (p2s-p32) for low fuel consumption. The geometric design of the λ-segment is hereby in particular dominated by the intake air requirement of the internal combustion engine 10. The denomination of the "λ-segment"of the turbine 18 is based hereon. The use of the adjustment device 44 is in principle also conceivable with exhaust gas turbochargers 20 or turbines 18 of passenger motor vehicles internal combustion engines 10 or Otto or Diesotto engines, wherein it can be provided that the two flows or spiral channels 16a, 16b of the double-flow turbine 18 have a symmetric retention behavior at least in connection with an Otto engine.

FIG. 3 shows a further clarification of a schematic side view and partially in sections of the turbine 18 of the exhaust gas turbocharger 20 shown in FIGS. 1 and 2. Thereby, an adjustment lever 52 connected to the adjustment ring 48 can be seen in particular, which is guided through the turbine housing 38 and can be moved in a rotational manner for adjusting the spiral inlet cross sections $A_{S,\lambda}$, $A_{S,AGR}$ and nozzle cross sections $A_{R,\lambda}$, $A_{R,AGR}$ relative to the turbine housing 38. An actuator (not shown) is preferably associated with the adjustment lever 52, so that the adjustment lever 52 or the adjustment ring 48 can be moved in dependence on an operating state of the internal combustion engine 10.

Figure 4:
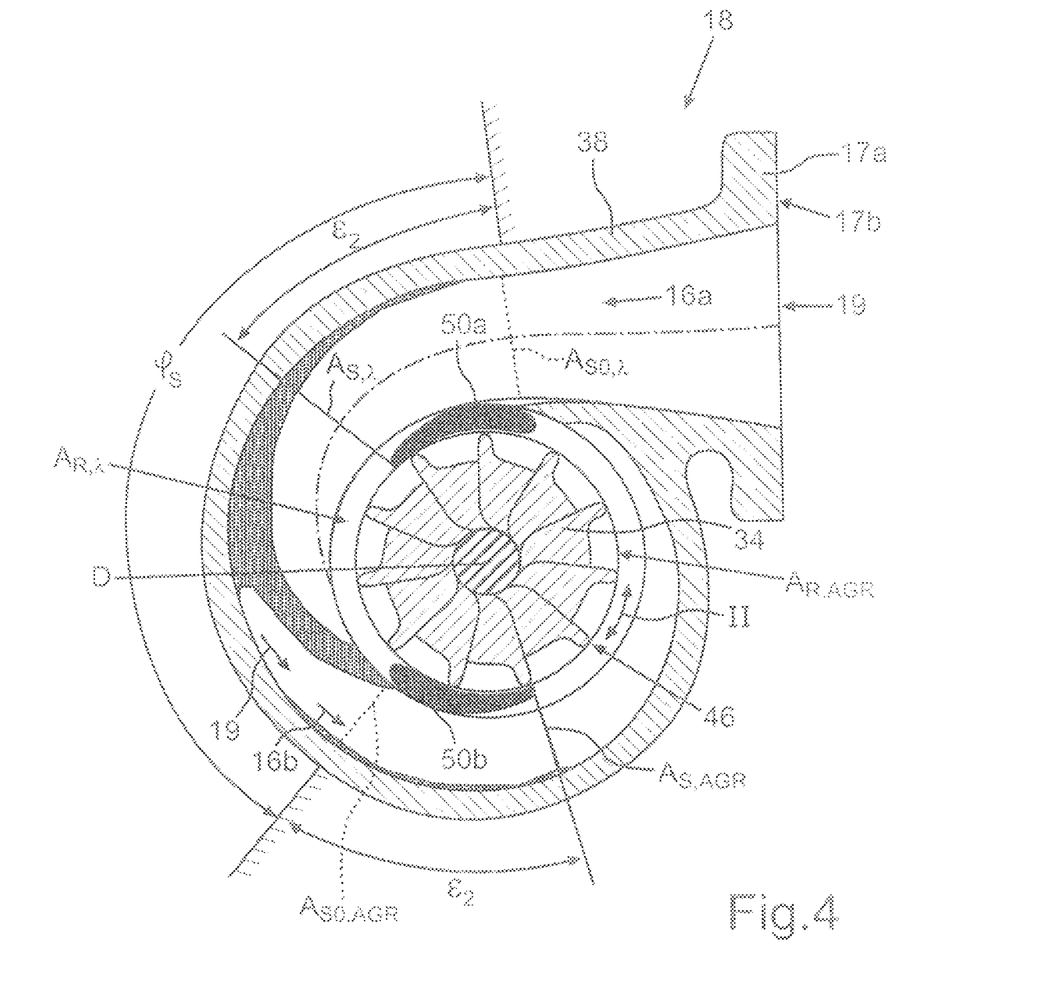
FIG. 4 is a further schematic cross sectional view of the turbine of the exhaust gas turbocharger, wherein an adjustment ring of the adjustment device compared to FIG. 2 is moved into a position maximally reducing the spiral inlet cross sections and the nozzle cross sections of the spiral channels.

FIG. 4 shows a further schematic cross section of the turbine 18 of the exhaust gas turbocharger 20 shown in the previous figures, wherein the adjustment ring 48 with the blocking bodies 50a, 50b is moved compared to FIG. 2 into a position maximally reducing the spiral inlet cross sections $A_{S,\lambda}$, $A_{S,AGR}$ and the nozzle cross sections $A_{R,\lambda}$, $A_{R,AGR}$ of the spiral channels 16a, 16b by an angle ϵ2 larger compared to the angle ϵ1.

Figure 5:
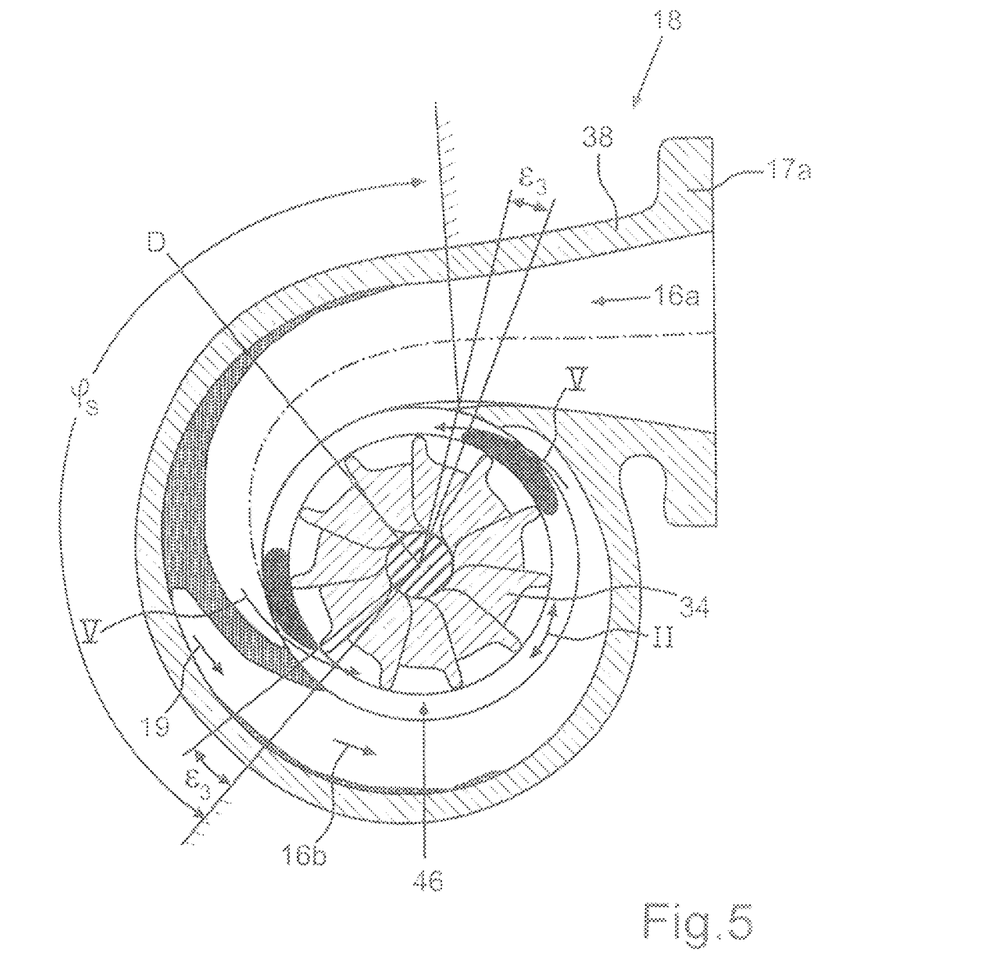
FIG. 5 is a further schematic cross section of the turbine of the exhaust gas turbo-charger, wherein the adjustment device is shown in a blowing position compared to FIG. 4, in which exhaust gas is blown between the two spiral channels.

FIG. 5 shows a further schematic cross section of the turbine 18 of the exhaust gas turbocharger 20 shown in the previous figures, wherein the adjustment ring 48 with the blocking bodies 50a, 50b is rotated around the angle ϵ3 and moved into a blow-over position compared to FIG. 2 and FIG. 4 according to the double arrow II, in which exhaust gas according to the arrows V from the spiral channel 16a serving as AGR spiral is blown into the spiral channel 16b serving as λ-spiral. A defined reduction of the retention capacity of the AGR spiral is enabled hereby, as is for example desired in the nominal point. In other words, the flow use or the definition of the two flows is inversed insofar compared to the previous embodiments that the AGR spiral 16a is now arranged upstream of the λ-spiral 16b. If the blow-over is to be realized for the general case, the smaller flow is naturally arranged upstream of the larger flow, so that the blow-over can take place in an operational-safe manner.

Figure 6:
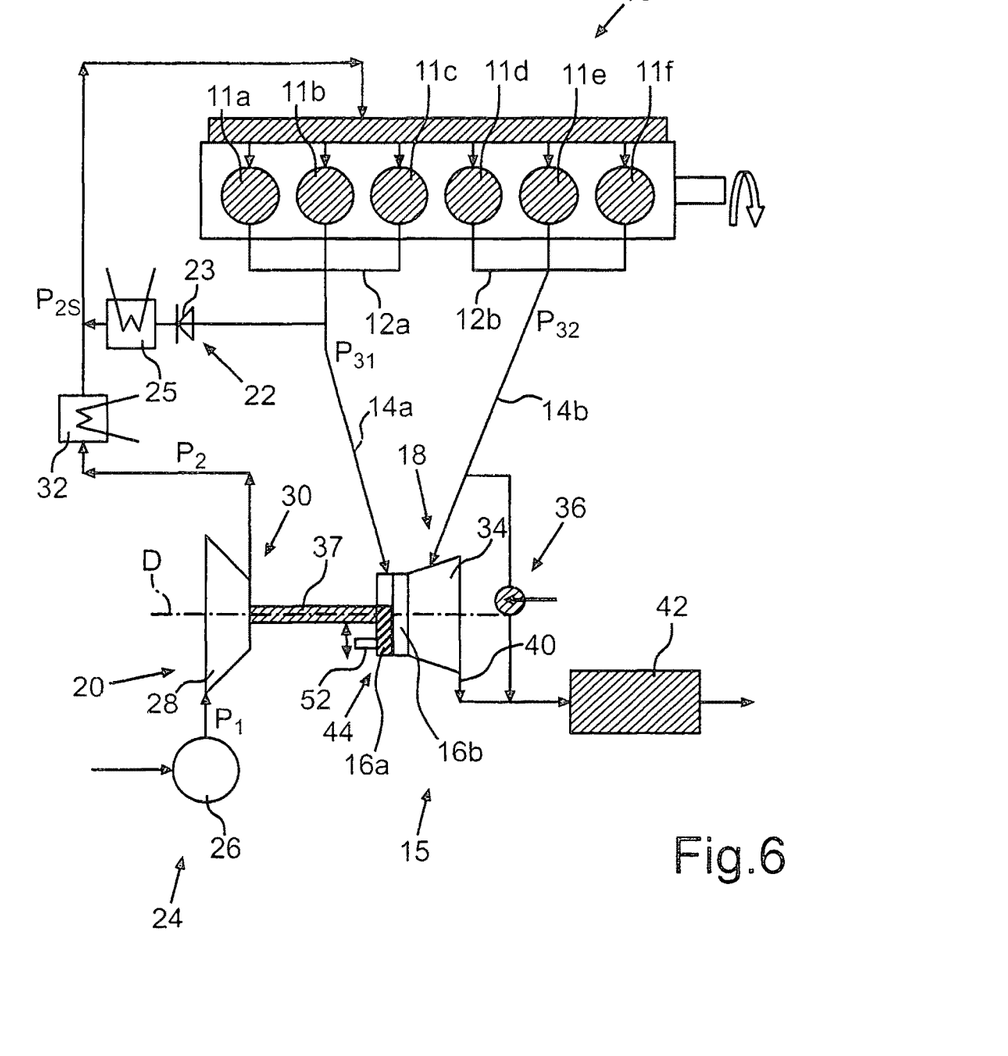
FIG. 6 is a depiction in principle of the internal combustion engine according to a second embodiment.

FIG. 6 shows schematically the internal combustion engine 10 according to a second embodiment. The principal construction is thereby already known from the previous descriptions. Compared to the first embodiment, the spiral channels 16a, 16b of the turbine 18 of the exhaust gas turbocharger 20 are presently arranged parallel to each other. FIG. 6 will be explained in the following in connection with FIG. 5, which shows a schematic side view of the turbine 18 and partially in sections of the exhaust gas turbocharger 20 shown in FIG. 6, and FIG. 9, which shows a schematic cross-sectional view of the spiral channel 16a of the turbines 18 of the turbocharger 20 formed as an AGR spiral shown in FIG. 6-8. The spiral channel 16a, which is formed as an AGR spiral and which is responsible for the AGR transport, is shown in FIG. 9 again as in the form a partial spiral with a wrapping angle $\phi_S$ of about 135°. Compared to this, the spiral channel 16b arranged in parallel and responsible for the λ-influencing is formed herein as a full spiral with a wrapping angle ϕ of about 350°. The adjustment device 44 comprises in the first embodiment only one blocking body 50a, by means of which the spiral inlet cross sections $A_{S,\lambda}$, $A_{S,AGR}$ and the nozzle cross sections $A_{R,\lambda}$, $A_{R,AGR}$ of the two spiral channels 16a, 16b can be adjusted together in an adjustable manner by rotating the adjustment ring 48 around the rotational axis D.

Figure 8:
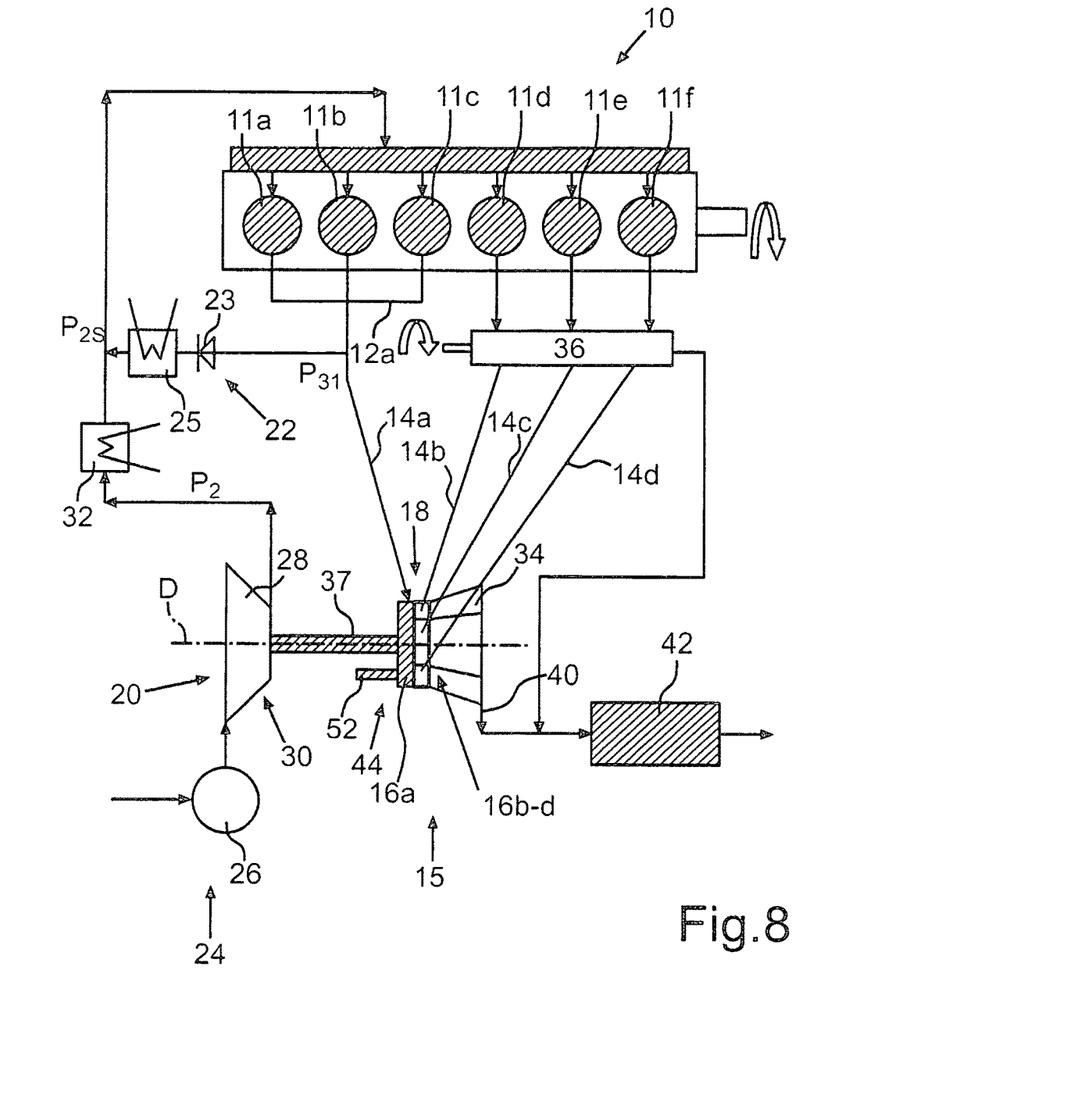
FIG. 8 is a depiction in principle of the internal combustion engine according to a third embodiment.
Figure 9:
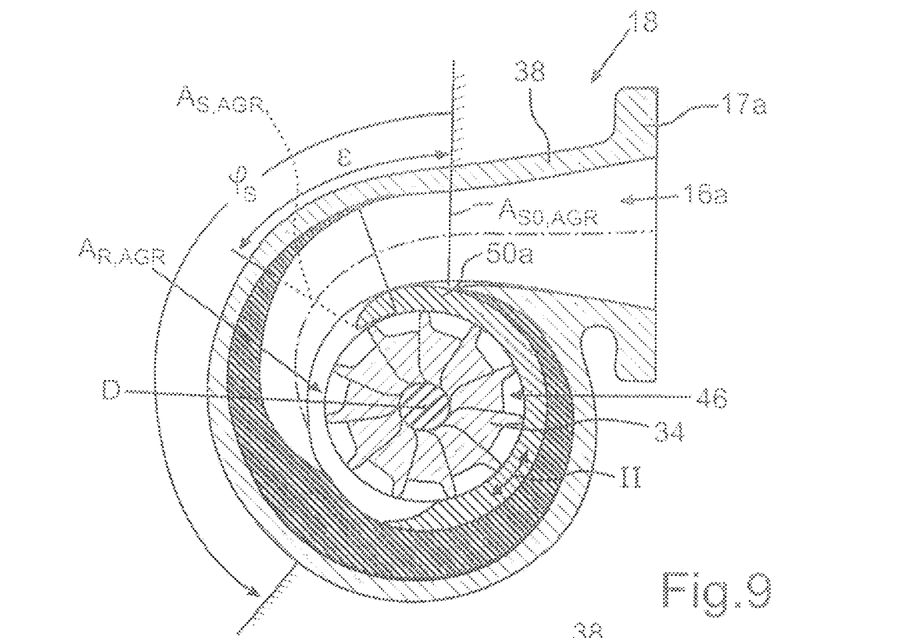
FIG. 9 is a schematic cross section of the spiral channel of the turbines formed as AGR spiral of the exhaust gas turbochargers shown in FIG. 6-8, wherein the adjustment device is shown in the position reducing the spiral inlet cross section and the nozzle cross section of the spiral channel.
Figure 10:
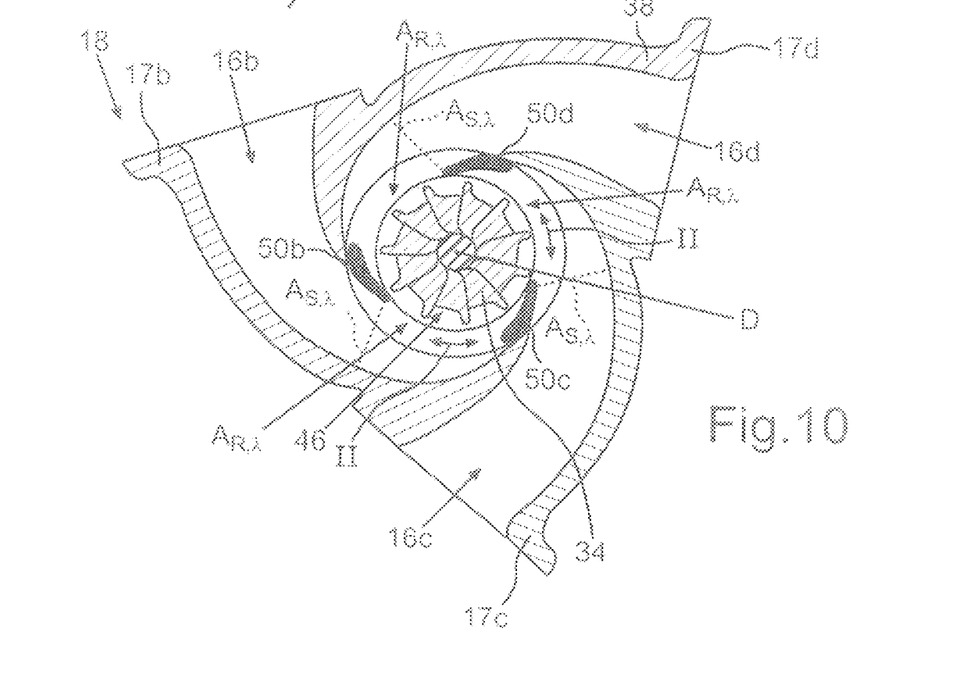
FIG. 10 is a schematic cross sectional view of three spiral channels of the turbine formed as λ-spiral segments of the exhaust gas turbocharger shown in FIG. 8.

FIG. 8 shows schematically of the internal combustion engine 10 in principle according to a third embodiment. Compared to the previous embodiments, the gas guiding device 36 is formed as a blow-by and blow-off device, so that the outlets of the three cylinders 11d-f can optionally be connected to one or several of the spiral channels 16b-d (FIG. 10) and/or exhaust gas can be guided past the turbine 18. The turbine 18 of the exhaust gas turbocharger 20 comprises the spiral channel 16a formed as an AGR spiral and connected to the exhaust gas line 14a, which—as described previously—is designed due to the AGR requirement as a partial spiral with the looping angle $\phi_S$ (see FIG. 4), which is chosen clearly below a full spiral of 360° due to the desired AGR capability (e.g. EPA07-limit value fulfillment) with an optimum design. The turbine 18 further comprises three further spiral channels 16b-d formed as λ-spiral segments with respective wrapping angles ϕ of about 120°, which are shown in FIG. 10 in more detail in a schematic cross sectional view. The spiral channels 16b-d, which are respectively connected to one of the exhaust gas lines 14b-d and are arranged parallel to the receiving chamber 48 opposite the spiral channel 16a, can be used for an extreme impact charging operation on the λ-side of the turbine 18. With the help of the gas guide device 36 arranged in the manifold, one can switch between the extreme impact charging operation and an at least approximate retention charging operation. The blocking bodies 50a-d are connected at least indirectly to the adjustment ring 48 and are again moved simultaneously. It can alternatively be provided that the blocking bodies 50a and 50b-d are moved separately from each other.

Figure 11:
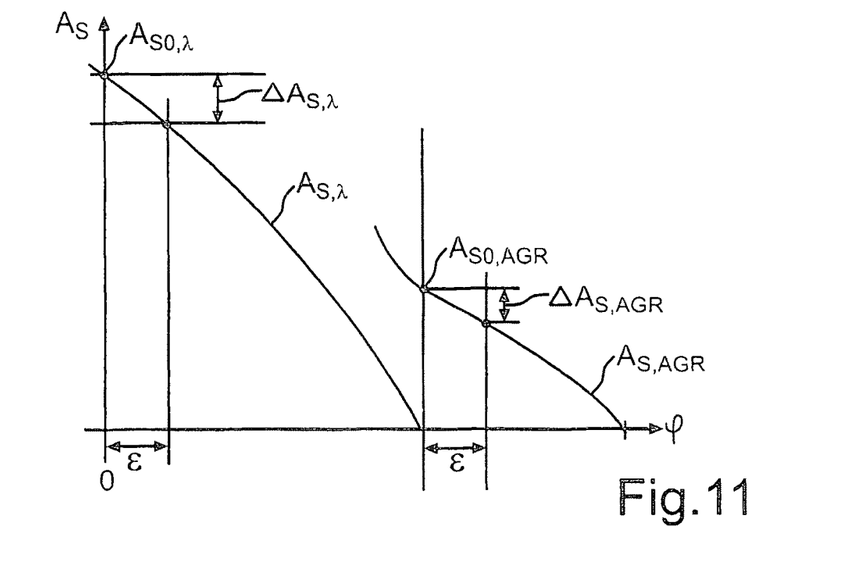
FIG. 11 is a schematic diagram of the surface progressions of the spiral inlet cross sections of the spiral channels of the exhaust gas turbocharger shown in FIG. 2-5 in dependence on the position of the adjustment device.

FIG. 11 shows a schematic diagram of the changing spiral inlet flow cross sections $A_{S,\lambda}$, $A_{S,AGR}$ of the spiral channels 16a, 16b arranged circumferentially one after the other in the exhaust gas turbocharger 20 shown in FIG. 2-5 in dependence on the wrapping angle ϕ and the angle position of the adjustment device 44 or its blocking bodies 50a, 50b. In the respective spiral channel 16a, 16b, the flow is accelerated by a cross-section reduction in the flow direction. The respective base spiral inlet cross section $A_{SO,\lambda}$, $A_{SO,AGR}$ represents the maximum available spiral flow cross section $A_S$. By the common turning of the blocking bodies 50a, 50b around the axis D by the angle £, a spiral flow crpss-section reduction by $\Delta A_{S,\lambda}$, $\Delta A_{S,AGR}$ to $A_{S,\lambda}$, $A_{S,AGR}$ is obtained in the available rotation angle range of the adjustment device 44. Simultaneously,—as described—the nozzle cross sections $A_{R,\lambda}$, $A_{R,AGR}$ are hereby also reduced in a corresponding manner.

Figure 7:
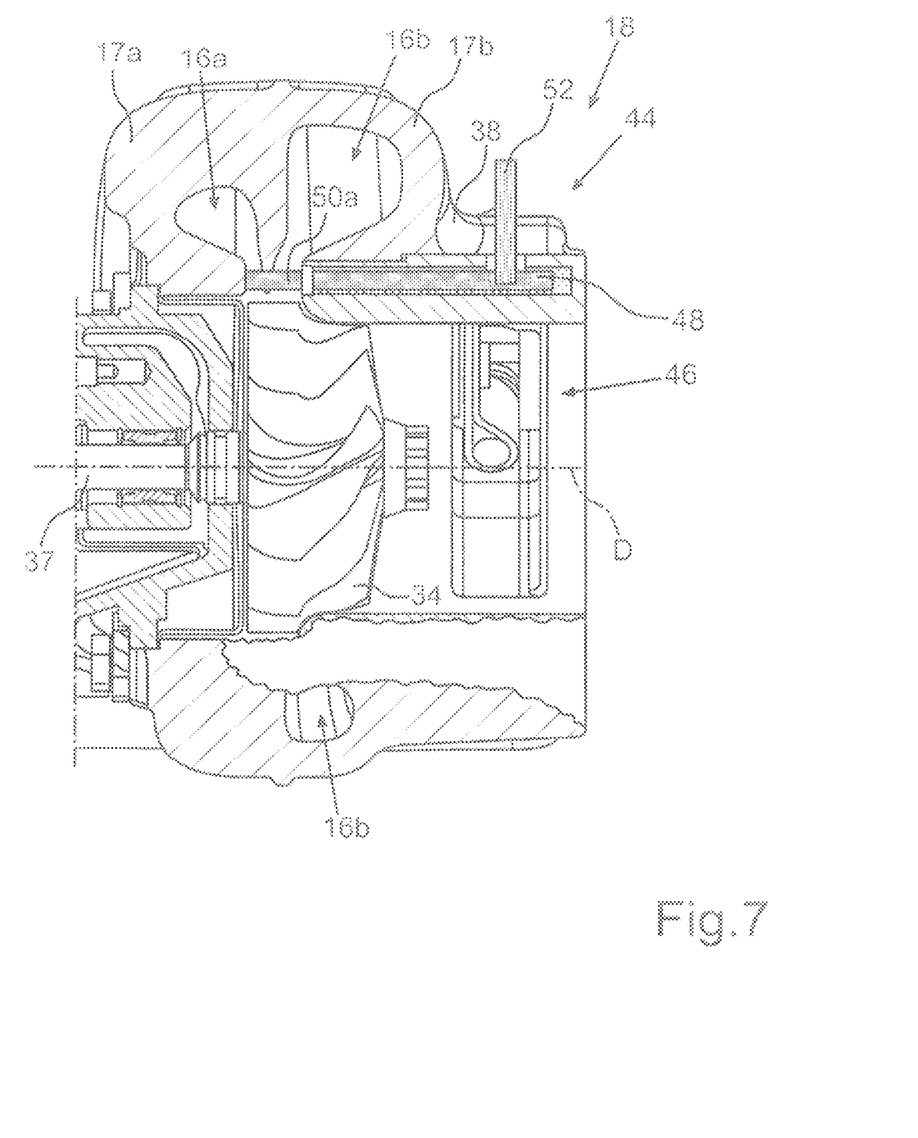
FIG. 7 is a schematic side view and partially in section of the turbine of the exhaust gas turbocharger of the internal combustion engine shown in FIG. 6.
Figure 12:
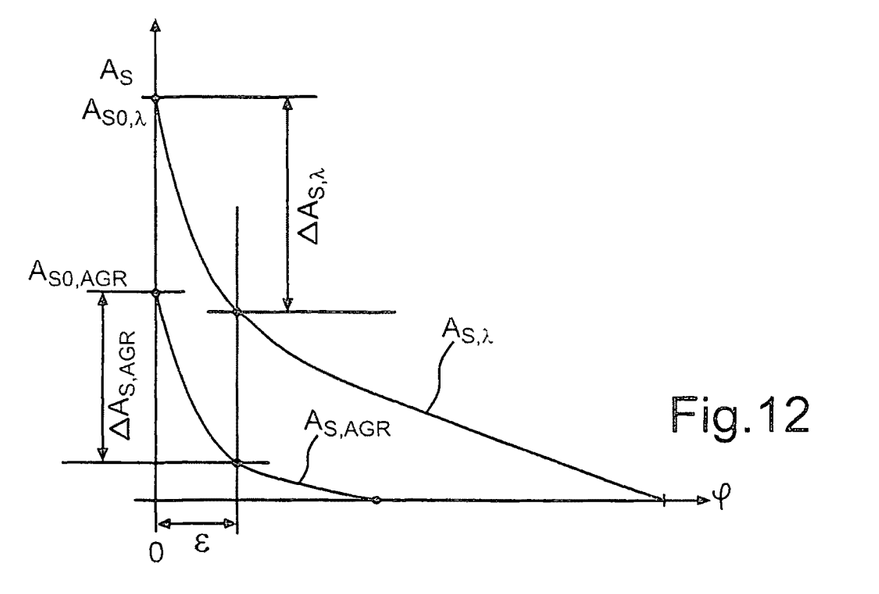
FIG. 12 is a schematic diagram of the surface progressions of the spiral inlet cross sections of the spiral channels of the exhaust gas turbocharger shown in FIG. 6-7 in dependence on the position of the adjustment device.

FIG. 12 shows a schematic diagram of the surface progressions of the spiral inlet cross sections $A_{S,\lambda}$, $A_{S,AGR}$ of the spiral channels 16a, 16b connected in parallel of the exhaust gas turbocharger 20 shown in FIG. 6-7 in dependence on the looping angle ϕ and the angle position of the adjustment device 44 or of the blocking bodies 50a, 50b. The spiral inlet cross sections $A_{S,\lambda}$), $A_{S,AGR}$ in the adjustment angle region c of the blocking body 50a decreases continuously in this example, whereby a high sensibility of the swirl change of the exhaust gas flow can be effected. In the center of the spiral design is not the realization of a constant nozzle outlet angle of the flow, but the generation of a variability with a wide spread of $\Delta A_{S,\lambda}$, $\Delta A_{S,AGR}$ for influencing a large variability in the retention capability and the turbine performance for ensuring the provision of the engine air requirement.

What is claimed is:

1. An internal combustion engine (10) comprising:
   a compressor (30) disposed in an intake tract (24) of the internal combustion engine (10) and a turbine (18) disposed in an exhaust gas tract (15) of the internal combustion engine (10);
   the turbine (18) having a turbine housing (38) comprising a receiving space (46) and first and second spiral inlet channels (16a, 16b);
   an inwardly extending housing tongue (101) separating the first and second spiral inlet channels (16a, 16b) from each other;
   the first spiral inlet channel (16a) being coupled with a first exhaust gas line (14a);
   the second spiral inlet channel (16b) being coupled with a second exhaust gas line (14b) of the exhaust gas tract (15);
   a turbine wheel (34), which is arranged within the receiving space (46) of the turbine housing (38) so as to be rotatable about a rotational axis (D) and which is acted on by exhaust gas of the internal combustion engine (10) fed through the first and second spiral inlet channels (16a, 16b) for driving the turbine wheel (34);

a compressor wheel (28) of the compressor (30) is rotationally fixedly connected to the turbine wheel (34) by means of a shaft (37);

the turbine (18) comprising an adjustment device (44) including an adjustment ring (48) supported in the turbine housing (38) so as to be rotatable around the turbine wheel (34) and having circumferentially spaced blocking bodies (50a, 50b) which have a radially inner surface area closely adjacent the turbine wheel (34) and a radially outer surface area arranged closely adjacent an inner end of the housing tongue (101);

the blocking bodies (50a, 50b) are movable with the adjustment ring (48) between the turbine wheel and the housing tongue (101) axially into and out of turbine inlet nozzle cross-sections ($A_R$) of the first and second spiral inlet channels (16a, 16b), which adjusts an axial width of the turbine inlet nozzle cross-sections ($A_R$) of the first and second spiral inlet channels (16a, 16b), and the blocking bodies (50a, 50b) also rotate at the same time around the turbine wheel (34), which adjusts a circumferential length of the radial turbine inlet nozzle cross-sections ($A_R$) of the first and second spiral inlet channels (16a, 16b);

the turbine inlet nozzle cross-sections ($A_R$) of the first and second spiral inlet channels (16a, 16b) are distributed adjacent to each other around the rotational axis (D) of the turbine wheel (34) over a circumference of the turbine wheel (34); and the adjustment device (44) controls the turbine inlet nozzle cross-sections ($A_R$) to the receiving space (46) via the first spiral inlet channel (16a) leading to one of the turbine inlet nozzle cross-sections ($A_{R,\lambda}$) and also of the second spiral inlet channel (16b) leading to the other of the turbine inlet nozzles cross-sections ($A_{R,AGR}$).

2. The Internal combustion engine according to claim 1, wherein the adjustment ring (48) with the blocking bodies (50a, 50b) is arranged in the region of the turbine inlet nozzle cross sections ($A_R$), the blocking bodies (50a, 50b) being movable at least between one position reducing spiral inlet flow cross sections ($A_s$) and the turbine inlet nozzle cross sections ($A_R$) and another position increasing the spiral radial turbine inlet flow cross sections ($A_s$) and the turbine inlet nozzle cross sections ($A_R$).

3. The internal combustion engine according to claim 2, wherein the blocking bodies (50a, 50b) each has an aerodynamic surface shape in its cross-section.

4. The internal combustion engine according to claim 2, wherein the adjustment device (44) comprises an adjustment lever (52) connected to the adjustment ring (48), where the adjustment lever extends through the turbine housing (38) and is movable in a rotational and translational manner relative to the turbine housing (38) for adjusting the spiral radial turbine inlet flow cross sections ($A_s$).

5. The internal combustion engine according to claim 1, wherein the adjustment device (44) is formed to direct the exhaust gas flow to the first and second spiral inlet channels (16a, 16b).

6. The internal combustion engine according to claim 1, wherein an exhaust gas recirculation line (22) is provided, by means of which exhaust gas from the exhaust gas tract (15) can be fed into the intake tract (24).

7. The internal combustion engine according to claim 1, wherein a gas flow device (36) is connected in the exhaust gas tract (15) upstream of the turbine (18), via which outlets of several cylinders (11d-f) of the internal combustion engine (10) which are connected to at least one of the first and second spiral inlet channels (16a, 16b) can by-pass the turbine (18).

8. A motor vehicle with the internal combustion engine (10) according to claim 1.

* * * * *